United States Patent
Dege et al.

(10) Patent No.: US 11,027,819 B2
(45) Date of Patent: Jun. 8, 2021

(54) METHOD AND A CONTROL UNIT FOR CONTROLLING ACTUATION OF A FOLDABLE WING TIP SECTION OF A WING OF AN AIRCRAFT

(71) Applicants: Airbus Operations GmbH, Hamburg (DE); Airbus Operations S.A.S., Toulouse (FR); Airbus Operations Ltd., Bristol (GB)

(72) Inventors: Saskia Dege, Hamburg (DE); Svenja Jegminat, Hamburg (DE); Frank Nienaber, Hamburg (DE); Jean Guilhamet, Toulouse (FR); Aeron Charles Jones, Bristol (GB)

(73) Assignees: Airbus Operations GmbH, Hamburg (DE); Airbus Operations (SAS), Toulouse (FR); Airbus Operations Limited, Bristol (GB)

( * ) Notice: Subject to any disclaimer, the term of this patent is extended or adjusted under 35 U.S.C. 154(b) by 264 days.

(21) Appl. No.: 16/193,309

(22) Filed: Nov. 16, 2018

(65) Prior Publication Data
US 2020/0023938 A1   Jan. 23, 2020

(30) Foreign Application Priority Data

Nov. 17, 2017   (DE) .................. 10 2017 127 198.8

(51) Int. Cl.
*B64C 3/56*   (2006.01)
*B64C 13/16*   (2006.01)
*B64D 45/00*   (2006.01)

(52) U.S. Cl.
CPC ............... *B64C 3/56* (2013.01); *B64C 13/16* (2013.01); *B64D 45/0005* (2013.01)

(58) Field of Classification Search
CPC .. B64C 13/16; B64C 3/56; B64C 3/16; B64C 3/18; B64C 3/04; B64C 23/065; B64C 23/072; B64D 45/00; B64D 45/0005
See application file for complete search history.

(56) References Cited

U.S. PATENT DOCUMENTS 4,598,885 A * 7/1986 Waitzman ............. B64C 23/076
244/13
5,268,698 A * 12/1993 Smith, Sr. ................. G01S 5/04
340/552

(Continued)

FOREIGN PATENT DOCUMENTS

EP   2 727 829   5/2014
EP   2 727 830   5/2014

(Continued)

OTHER PUBLICATIONS

Search Report for DE 10 2017 127 198.8, dated Sep. 5, 2018, 5 pages.

*Primary Examiner* — Medhat Badawi
(74) *Attorney, Agent, or Firm* — Nixon & Vanderhye P.C.

(57) ABSTRACT

A method to control folding of a wing tip section about a fixed base wing section by a control system that automatically determines whether: (i) a command signal is received to fold the wing tip section, (ii) a first condition indicating signal indicates that the aircraft is on the ground; (iii) the current speed of the aircraft is no greater than a preset maximum speed, and (iv) the aircraft is not at gate in an airport.

14 Claims, 4 Drawing Sheets

(56) References Cited

U.S. PATENT DOCUMENTS

| | | | | |
|---|---|---|---|---|
| 5,988,563 | A * | 11/1999 | Allen | B64C 3/56 244/49 |
| 6,227,487 | B1 * | 5/2001 | Clark | B64C 23/072 244/99.12 |
| 6,947,742 | B1 * | 9/2005 | Corrigan | G08G 5/0013 340/947 |
| 8,651,431 | B1 * | 2/2014 | White | B64C 23/076 244/218 |
| 10,005,564 | B1 * | 6/2018 | Bhatia | B64C 1/22 |
| 2006/0007035 | A1 * | 1/2006 | Corrigan | G08G 5/0013 342/29 |
| 2008/0191099 | A1 * | 8/2008 | Werthmann | B64C 23/072 244/199.4 |
| 2012/0267472 | A1 * | 10/2012 | Pratzovnick | B64C 39/024 244/13 |
| 2014/0014768 | A1 * | 1/2014 | Lassen | B64C 3/56 244/49 |
| 2015/0014478 | A1 * | 1/2015 | Lassen | B64C 3/56 244/49 |
| 2015/0108283 | A1 * | 4/2015 | Thoreen | B64C 9/00 244/234 |
| 2015/0142223 | A1 * | 5/2015 | Barbour | B64C 13/16 701/4 |
| 2015/0298793 | A1 * | 10/2015 | Fox | B64C 3/56 244/49 |
| 2016/0152318 | A1 * | 6/2016 | Alexander | B64D 27/18 244/13 |
| 2016/0251073 | A1 * | 9/2016 | Good | B64C 3/56 244/49 |
| 2017/0021911 | A1 * | 1/2017 | Wildschek | B64C 3/42 |
| 2018/0186448 | A1 * | 7/2018 | Pantalone | B64C 39/024 |
| 2019/0002083 | A1 * | 1/2019 | Wilson | B64C 23/065 |
| 2019/0086937 | A1 * | 3/2019 | Lee | G05D 1/0653 |
| 2019/0128780 | A1 * | 5/2019 | Pilon | F02D 41/22 |
| 2019/0382128 | A1 * | 12/2019 | Prost | B64D 45/00 |

FOREIGN PATENT DOCUMENTS

| | | |
|---|---|---|
| EP | 2 862 797 | 4/2015 |
| EP | 3 190 043 | 7/2017 |

* cited by examiner

METHOD AND A CONTROL UNIT FOR CONTROLLING ACTUATION OF A FOLDABLE WING TIP SECTION OF A WING OF AN AIRCRAFT

RELATED APPLICATION

This application claims priority to German Patent Application No. 10 2017 127 198.8 filed Nov. 17, 2017, the entirety of which is incorporated by reference.

FIELD

The present invention relates to a method for controlling actuation of a foldable wing tip section of a wing of an aircraft.

BACKGROUND

The present invention relates to a method for controlling actuation of a foldable wing tip section of a wing of an aircraft. The wing includes a base section (such as a fixed wing) having a first end portion adapted to be secured to the fuselage of an aircraft and an opposite second end portion, and a tip section (such as a wing tip device) having a third end portion and an opposite fourth end portion. The third end portion is pivotably connected to the second end portion such that the tip section is pivotable about a pivot axis between a deployed position and a stowed position in which the spanwise length of the wing is smaller than in the deployed position, and an actuating system which is coupled to a control unit of the aircraft and which is operable to selectively move, under the control of the control unit, the tip section between the deployed position and the stowed position.

The aspect ratio of an aircraft wing is one factor influencing the efficiency of the aircraft during flight. The aspect ratio is the ratio of the span to the chord of the wing. Generally, an increase of the aspect ratio is associated with an increased efficiency during steady flight. Therefore, an increase of the wingspan of an aircraft is one factor to take into consideration when seeking to reduce fuel consumption. However, when elongating the wing of an existing family of aircraft, it may become necessary to adapt the aircraft family specific infrastructure, and airport fees may increase.

One possibility to increase the wingspan without having to adapt the aircraft family specific infrastructure and having to deal with increased airport fees, or to reduce airport fees for existing aircraft is to provide for a foldable wing construction which allows to pivotably move an outboard end section of the wing between a deployed position, in which the wing has its normal flight configuration, and a stowed position, in which the wing has a folded configuration and the wingspan is decreased as compared to the deployed position.

SUMMARY

An invention has been made and is disclosed herein that may be embodied as a method for controlling actuation of a foldable wing tip section of a wing of an aircraft. The present invention may be embodied as a method for controlling actuation of a foldable wing tip section of a wing of an aircraft, which method assists the pilot in ensuring that the aircraft is in a condition safe for a change of the position of the foldable wing tip, and to provide a control unit implementing the method and an aircraft comprising the control unit.

The method comprises receiving, at a control unit of an aircraft, a command signal. The aircraft comprises a wing arrangement which includes a wing having a base section and a tip section. The base section has a first end portion, which is adapted to be secured to the fuselage of an aircraft, and an opposite second end portion. Thus, when the wing is mounted to a fuselage of an aircraft at its first end portion the second end portion of the base section is remote from the fuselage, i.e., a terminal end of the first end portion constitutes the inboard end of the base section and of the entire wing and an opposite terminal end of the second end portion constitutes the outboard end of the base section.

The tip section has a third end portion and an opposite fourth end portion. The third end portion is pivotably connected to the second end portion such that the tip section is pivotable about a pivot axis between a deployed position and a stowed position in which the spanwise length of the wing is smaller than in the deployed position. In other words, when two of the wings are mounted to opposite sides of a fuselage of an aircraft, the length of the shortest straight line between the outermost wingtips of the two wings is larger—and may be maximized—in the deployed position than in the stowed position. In particular, the distance between the first end portion and the fourth end portion may be larger—and may be maximized—in the deployed position than in the stowed position. The deployed position, the stowed position or both may be defined by a respective tip section stop mechanism. Then, a part of the tip section abuts the respective tip section stop mechanism when the tip section reaches the deployed position or the stowed position upon being moved from the stowed position into the deployed position and from the deployed position into the stowed position, respectively, and is movable out of abutment towards the stowed position and the deployed position, respectively.

Thus, when the wing is mounted to a fuselage of an aircraft at its first end portion, and at least in the deployed position of the tip section, the third end portion of the tip section is spaced from the fuselage by the base section and the fourth end portion is the outermost portion of the wing, i.e., a terminal end of the third end portion constitutes the inboard end of the tip section and an opposite terminal end of the fourth end portion constitutes the outboard end of the tip section and of the entire wing.

It is to be noted that, in case the wing includes a wing tip device, the tip section may be the wing tip device. The tip section may comprise the wing tip device and additionally a further portion of the wing at the inboard side of the wing tip device. In this regard, in the usual manner wing tip devices are understood as devices or wing sections installed at the outermost end of a wing and being adapted to increase the effective aspect ratio of a wing without materially increasing the wingspan and to reduce drag by partially recovering the energy of tip vortices.

The pivot axis may be oriented in a direction extending between a first edge and a second edge of the wing opposite to each other in a chord direction of the wing, and may be in a or the local chord direction or in the line of flight. Thus, when moving the tip section from the deployed position into the stowed position, the tip section is pivoted downwardly or upwardly with respect to the base section. However, it is also possible that the pivot axis is oriented in a direction extending transversely or perpendicularly with respect to a plane defined by a chord direction and the wingspan direction, e.g. in the direction of the yaw axis.

The aircraft may further comprise an actuating system which is coupled to the control unit and which is operable to selectively move, under the control of the control unit, the tip section between the deployed position and the stowed position, i.e. from the deployed position to the stowed position and from the stowed position to the deployed position.

The command signal is adapted to instruct the control unit to control the actuating system to move the tip section from the deployed position into the stowed position or from the stowed position into the deployed position. The command signal may be one of a first predetermined command signal and a second predetermined command signal. The first predetermined command signal is adapted to instruct the control unit to control the actuating system to move the tip section from the deployed position into the stowed position, and the second predetermined command signal is adapted to instruct the control unit to control the actuating system to move the tip section from the stowed position into the deployed position.

The method may further comprise of receiving, at the control unit, a first condition indicating signal, and determining, by the control unit, based on the first condition indicating signal if a first condition is met that the aircraft is on the ground. This is possible, because the first condition indicating signal is indicative of whether or not the aircraft is on the ground, i.e. it directly indicates whether or not the aircraft is on the ground or enables the control unit to determine whether or not the aircraft is on the ground.

The method may also comprise receiving, at the control unit, a second condition indicating signal, and determining, by the control unit, based on the second condition indicating signal if a second condition is met that the current speed of the aircraft is below a predetermined maximum speed. This is possible, because the second condition indicating signal is indicative of a current speed of the aircraft, i.e. it directly indicates the current speed of the aircraft or enables the control unit to determine the current speed of the aircraft. The maximum speed may be chosen such that predetermined aerodynamic loads acting on the tip section and the actuating system are not exceeded, and that it is safe for the aircraft to move the tip section at this speed.

Moreover, the method may comprise receiving, at the control unit, a third condition indicating signal, and determining, by the control unit, based on the third condition indicating signal if a third condition is met that the aircraft is not at a gate of an airport. This is possible, because the third condition indicating signal is indicative of whether or not the aircraft is at a gate of an airport, i.e. it directly indicates whether or not the aircraft is at a gate of an airport or enables the control unit to determine whether or not the aircraft is at a gate of an airport.

The method may comprise controlling the actuating system to effect the movement of the tip section instructed by the command signal only if all of the first condition, the second condition and the third condition are met. In other words, if one or more of the first condition, the second condition and the third condition are not met the control unit does not follow the command signal and does not effect the movement of the tip section instructed by the command signal. For example, if at least one of the conditions is not met the movement may be inhibited by the control unit, the command signal may be disregarded and/or the command signal may be used by the control unit to generate an error or warning message for output in the aircraft. Generally, it may also be advantageous to configure the control unit such that if upon receipt of the command signal not all three conditions are met, the movement of the tip section instructed by the command signal is effected as soon as all three conditions are met at a later time. This allows the pilot to preselect or pre-command tip section movement, which is then automatically carried out a soon as the control unit determines that all three conditions are met.

The method may be used to ensure that the tip section is not moved if the aircraft is not on the ground, if loads on the tip section and the actuating system caused by aircraft movement are above a certain limit, or if the aircraft is at a gate where movement of the tip section and, in particular, movement of the tip section from the stowed position into the deployed position may cause damage due to lack of space. Thus, the method assists in ensuring safe operation of the foldable wing tip. This is achieved without having to modify the manner in which an aircraft generates command signals for instructing movement of the tip section.

Generally, it should be noted that embodiments of condition indicating signals may be provided in which one or more further condition indicating signals are received at the control unit, which are indicative of one or more further conditions. Then, it may advantageously be provided that the actuating system is controlled to effect the movement of the tip section instructed by the command signal only if all of the first condition, the second condition and the third condition as well as the one or more further conditions are met.

The first condition indicating signal may be a signal indicating a weight-on-wheels signal provided by one or more weight-on-wheels detectors of the aircraft.

The second condition indicating signal may indicate a current speed of the aircraft with respect to the ground. For example, it may be indicative of the speed of one or more wheels of the aircraft, which is a measure for the speed of the aircraft with respect to the ground. The second condition indicating signal may be indicative of a current speed of the aircraft with respect to the air surrounding the aircraft. Utilizing the current speed with respect to the air surrounding the aircraft may be advantageous because it takes into consideration that a certain speed with respect to the ground may involve a higher speed with respect to the surrounding air. Further, in conditions with high wind speeds the control unit may indicate to the pilot that the aircraft needs to slow down before operation of the tip section is allowed. Overall, using the speed with respect to the surrounding air may be useful for further reducing the loads acting on the tip section and the actuating system, or for increasing the maximum allowable speed of the aircraft with respect to the ground for safe operation of the tip section.

The third condition indicating signal may be a signal indicative of whether or not engines of the aircraft are on. Since the engines are not switched on when the aircraft is at the gate of an airport, the signal also indicates whether or not the aircraft is at a gate. The third condition indicating signal may be a location signal indicative of a current location of the aircraft: The location signal may enable the control unit to determine the absolute position of the aircraft or a relative position of the aircraft with respect to gates of an airport, or it may merely be indicative of the fact that the aircraft is currently in the vicinity of a transmitter of the location signal or another device causing generation of the location signal, wherein the transmitted or device are fixedly installed at an airport.

For example, if the location signal is indicative of an absolute position of the aircraft, the control unit may be adapted to determine if the third condition is met by comparing the absolute position of the aircraft with a map of an airport. Such a map may be stored in the control unit or may be received by the control unit via wired or wireless communication means. The location signal may be, e.g., a GPS signal received by a GPS receiver integrated into or connected to the control unit, or a location signal received from an external transmitter provided at an airport and tracking the position of the aircraft.

The location signal may be a signal transmitted by a transmitter installed at an airport when the aircraft passes the transmitter within a predetermined distance, or a signal generated by a sensor of the aircraft when the aircraft passes a location indicating device, which is installed at an airport, within a predetermined distance. In any case, the transmitter or the location indicating device is fixedly installed at an airport remote from gates of the airport.

The command signal may be a manual command issued by a pilot of the aircraft, e.g. by actuating a corresponding control means in the cockpit, such as a button or lever, or is provided automatically by a control computer of the aircraft. The control unit may be part of the control computer or may be a separate component.

The method may further comprise receiving, at the control unit, a fourth condition indicating signal. The fourth condition indicating signal is a location signal indicative of a current location of the aircraft. It may be the same or a different location signal than the location signal mentioned and described in detail above. The control unit is adapted to issue warnings or automatically generate the command signal instructing the control unit to control the actuating system to effect movement of the tip section between the stowed position and the deployed position based on the fourth condition indicating signal and on a current position of the tip section. This makes it possible that, for example, the pilot receives warnings when the aircraft is about to enter an area in which the current position of the tip section is prohibited, such as a taxiway not suitable for the deployed position of the tip section, or that the tip section movement is automatically controlled based on the position of the aircraft and the current tip section position, e.g. automatically deploying the tip section at the earliest possible point in time after leaving the gate and well in advance of reaching the runway. Thus, in this case the received command signal may be generated within the control unit itself. Of course, it is also possible that the pilot receives a warning or information to deploy the tip section at the earliest possible point in time after leaving the gate and well in advance of reaching the runway. In any case, if the fourth condition indicating signal is a location signal which is not highly reliable, such as a rather coarse location signal received from an airport, additional safety is provided by the control unit still taking into consideration the first, second and third condition indicating signals.

The control unit may be adapted to determine based on the fourth condition indicating signal whether the aircraft is entering an area in which the deployed position is prohibited, and to issue a warning in case it is determined that the aircraft is entering an area in which the deployed position is prohibited and the tip section is in the deployed position.

The control unit may be adapted to determine based on the fourth condition indicating signal whether the aircraft is entering an area in which it is allowed to move the tip section from the stowed position to the deployed position, and to automatically generate the command signal instructing the control unit to control the actuating system to effect movement of the tip section from the stowed position into the deployed position if it is determined that the aircraft is entering an area in which it is allowed to move the tip section from the stowed position to the deployed position and the tip section is currently in the stowed position.

In any case, similar to the description of the location signal provided above, the fourth condition indicating signal may be indicative of an absolute position of the aircraft, and the control unit may be adapted to determine a current position of the aircraft with respect to an airport by comparing the absolute position of the aircraft with a map of the airport. Such a map may be stored in the control unit or may be received by the control unit via wired or wireless communication means. The location signal may be, e.g., a GPS signal received by a GPS receiver integrated into or connected to the control unit, or a location signal received from an external transmitter provided at an airport and tracking the position of the aircraft. Alternative, as likewise described for the location signal above, the fourth condition indicating signal may be a signal transmitted by a transmitter installed at an airport when the aircraft passes the transmitter within a predetermined distance, or a signal generated by a sensor of the aircraft when the aircraft passes a location indicating device, which is installed at an airport, within a predetermined distance. In any case, the transmitter or the location indicating device is fixedly installed at an airport remote from gates of the airport.

It is to be noted that it is in principle also possible to only provide for issuing warning or information messages of the above type to the pilot, i.e. warning or information messages informing or altering the pilot to initiate movement of the tip section at a particular location of the aircraft (e.g. upon reaching a location in which the tip section can or should be moved from the stowed position into the deployed position), or alerting the pilot that movement of the tip section is no longer possible at the current location of the aircraft. Then, it may be possible to only use the third condition indicating signal, but not to make use of the first and/or second condition indicating signals, and/or to also allow for controlling the actuating system to effect the movement of the tip section instructed by the command signal if one, more or all of the first condition, the second condition and the third condition are not met.

According to the present invention, there is further provided a control unit for controlling actuation of a foldable wing tip section of a wing of an aircraft of the type described in detail above. The control unit is adapted to carry out the method according to any of the above-described embodiments, i.e. it is adapted to carry out each of the steps described in detail above. The method may be implemented in the control unit by hardware, software, firmware or any combination of hardware, software and/or firmware. For this purpose, the control unit may comprise a processor executing instructions to carry out the method.

In accordance with the purpose of the above-described methods and control unit, the control unit may be part of an aircraft. The aircraft further comprises a fuselage, and a wing arrangement which includes a wing comprising a base section having a first end portion adapted to be secured to the fuselage of an aircraft and an opposite second end portion, and a tip section having a third end portion and an opposite fourth end portion, wherein the third end portion is pivotably connected to the second end portion such that the tip section is pivotable about a pivot axis between a deployed position and a stowed position in which the spanwise length of the wing is smaller than in the deployed position, wherein the first end portion of the base section is attached to the fuselage and the base section is arranged between the fuselage and the tip section. The aircraft further comprises a control unit according to any of the above-described embodiments, and an actuating system which is coupled to the control unit and which is operable to selectively move, under the control of the control unit, the tip section between the deployed position and the stowed position.

DRAWINGS

The drawings included with this application illustrate an embodiment(s) of the invention. The drawings include:

DETAILED DESCRIPTION

Figure 1:
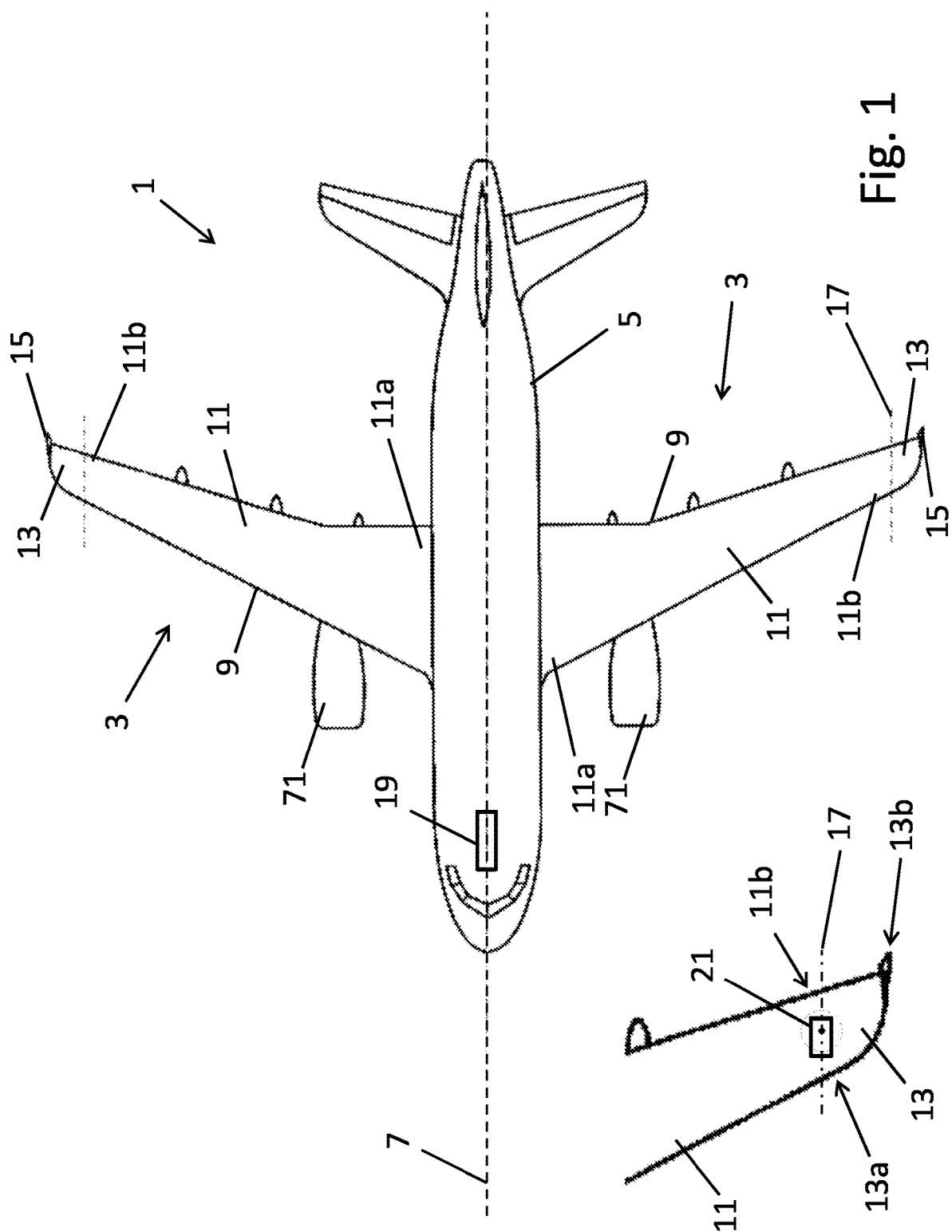
FIG. 1 shows a schematic top view of an aircraft for use in which the embodiments of the method and the control unit according to the present invention are adapted.

FIG. 1 shows a schematic top view of an aircraft 1 which comprises two wing arrangements 3 to which engines 71 are mounted. The aircraft 1 also comprises a fuselage 5 extending along a longitudinal axis 7 which corresponds to the x-axis of the aircraft 1. Each of the wing arrangements 3 comprises a wing 9 that extends away from the fuselage 5, and each wing 9 comprises a base section 11 and a tip section 13. The base section 11 has a first or inboard end portion 11a, which is configured or adapted to be coupled to the fuselage 5 and is shown to be coupled to the fuselage 5, and an opposite second or outboard end portion 11b spaced from the fuselage 5 by the remainder of the base section 11.

The tip section 13 of the wing 9 is pivotably connected to the second end portion 11b of the base section 11. More particularly, the tip section 13 extends away from the second or outboard end portion 11b of the base section 11 and comprises a third or inboard end portion 13a and an opposite fourth or outboard end portion 13b spaced from the base section 11 by the remainder of the tip section 13 (as can be seen in the insert of FIG. 1, which shows an outboard end region of one of the wings 9 in enlarged form). The fourth end portion may be provided by a part of a wing tip device 15, which itself is a part of the tip section 13. The third end portion 13a is pivotably mounted on or coupled to the second end portion 11b of the base section 11 in such a manner that the tip section 13 is able to pivot between a deployed position and a stowed position about a pivot axis 17.

The pivot axis 17 generally extends in a direction between a leading edge and a trailing edge of the respective wing 9 and, in the example shown, parallel or essentially parallel to the longitudinal axis 7, i.e., in the flight direction. In the deployed position illustrated in FIG. 1 the tip section 13 extends essentially along the longitudinal axis of the base section 11, and in the stowed position the tip section 13 is angled upwardly with respect to the longitudinal axis of the base section 11, so that the spanwise length of the wing 9 is decreased. Thus, in the deployed position the fourth end portions or the outermost outboard ends of the tip sections 13 of the wings 9 have a larger distance than in the stowed position, so that the wingspan of the aircraft 1 can be selectively decreased by moving the tip sections 13 of the wings 9 from the deployed position into the stowed position in order to allow for the use of infrastructure adapted to aircraft of such reduced wingspan and in order to save on airport fees, and increased in order to allow for reduced fuel consumption during flight.

In order to effect the pivotal movement of the tip section 13 between the deployed and the stowed positions, each of the wing arrangements 3 comprises an actuating system 21. The actuating system 21 is shown only very schematically in the insert of FIG. 1. The aircraft 1 also comprises a control unit 19, which may be part of the central control system of the aircraft 1. The control unit 19 is adapted to control at least part of the operation of the actuating system 21 based on command signals received by the control unit 19 and instructing the control unit 19 to control the actuating system 21 to move the tip section 13 from the stowed position into the deployed position or vice versa.

Figure 2:
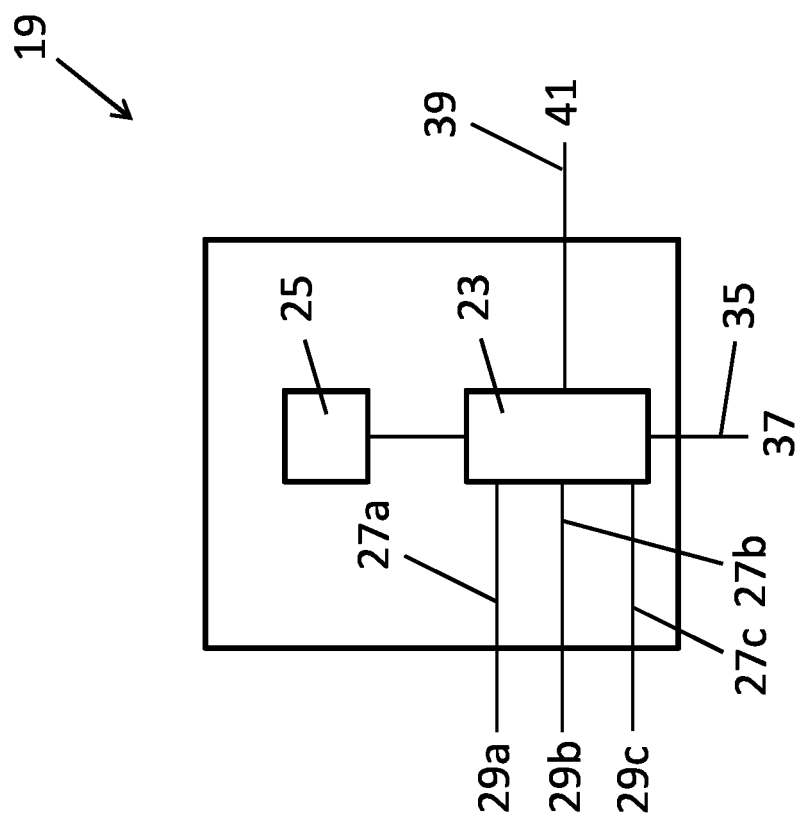
FIG. 2 shows a schematic block diagram of the control unit of the aircraft of FIG. 1.

A schematic block diagram of the control unit 19 is shown in FIG. 2. The control unit 19 comprises a processor 23 and a memory 25. The memory 25 is adapted to store instructions for the processor 23, and the processor 23 is adapted to execute the instructions stored in the memory 25 to thereby carry out the steps of the method of the present invention. In particular, the instructions stored in the memory 25 may be one or more software programs. The memory 25 is further adapted to store various data for use by the processor 23.

The processor 23 is coupled to three input lines 27a to 27c on which three different condition indicating signals 29a to 29c are received from the aircraft 1 or from external devices. The first condition indicating signal 29a is indicative of whether or not the aircraft is on the ground and may be, e.g., a weight-on-wheel signal, the second condition indicating signal 29b is indicative of a current speed of the aircraft, which may be a speed with respect to the ground or to the air surrounding the aircraft 1, and the third condition indicating signal 29c is indicative of whether or not the aircraft is at a gate of an airport, such as at the gate 31 of the airport 33 illustrated schematically in FIG. 4. The third condition indicating signal 29c may be, e.g., an engine on signal.

The processor 23 is further coupled to a command input line 35 on which a command signal 37 is received which is adapted to instruct the control unit 19 to control the actuating system 21 to move the tip section 13 from the deployed position into the stowed position or from the stowed position into the deployed position.

Finally, the processor 23 is coupled to a control output line 39, which is connected to the actuating system 21 and on which the processor 23 outputs a control signal 41 to the actuating system 21. The control signal 41 controls the actuating system 21 to effect movement of the tip section 13 from the deployed position into the stowed position or from the stowed position into the deployed position, depending on the control signal 41. The processor 23 is adapted to generate the control signal 41 in accordance with the command signal 37, but only if the condition indicating signals 29a to 29c indicate that all of three particular conditions are met. For this purpose, the processor 23 is further adapted to determine, based on the first condition indicating signal 29a, if a first condition is met that the aircraft is on the ground, to determine, based on the second condition indicating signal 29b, if a second condition is met that the current speed of the aircraft is below a predetermined maximum speed, which may be stored as set point in the memory 25, and to determine, based on the third condition indicating signal 29c, if a third condition is met that the aircraft is not at a gate of an airport, such as at the gate 31 of the airport 33 illustrated schematically in FIG. 4. Thus, the control signal 41 for controlling the actuating system 21 to effect the movement of the tip section 13 instructed by the command signal 37 is only output by the processor 23 via the control output line 39 if all of the above three conditions are met.

Figure 3:
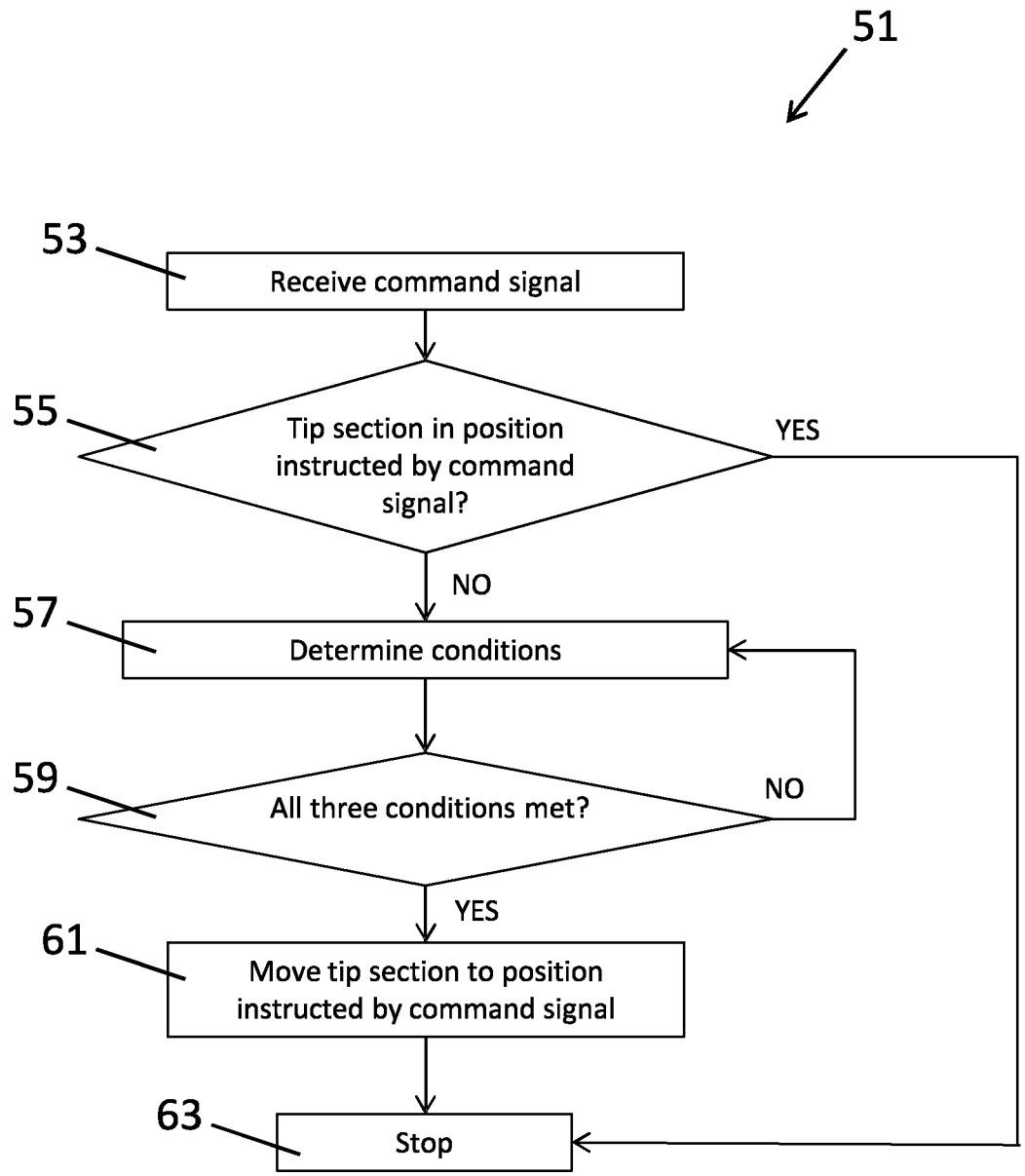
FIG. 3 shows a flow chart of an embodiment of the method according to the present invention for controlling movement of the tip section from the deployed position into the stowed position or from the stowed position into the deployed position.

FIG. 3 shows a flow chart of an embodiment of a control method implemented by the control unit 19 in order to effect movement of the tip section 13 from the deployed position into the stowed position or vice versa. It corresponds to normal operation and does not consider failure cases.

In step 53 the control unit 19 and the processor 23 receive a command signal 37 via the command input line 35 instructing the control unit 19 to control the actuating system 21 to move the tip section 13 from the deployed position into the stowed position or from the stowed positon into the deployed position, depending on the command signal 37. The command signal 37 may be generated by manual operation of a control element in the cockpit of the aircraft 1 or may be issued automatically, e.g. by the control unit 19 itself or by another control computer of the aircraft 1.

In step 55 the processor 23 determines whether the tip section is already in the position instructed by the command signal 37, i.e. in the stowed position if the command signal 37 is instructing the control unit 19 to control the actuating system 21 to move the tip section 13 from the deployed position into the stowed position or in the deployed position if the command signal 37 is instructing the control unit 19 to control the actuating system 21 to move the tip section 13 from the stowed positon into the deployed position. The determination of the position of the tip section 13 may be based, e.g., on a feedback signal of the actuating system 21 received at the control unit 19 via the control output line 39 or a separate line. If the tip section 13 is already in the respective position, the method moves to step 63 where the method ends. Otherwise, the method moves to step 57.

In step 57 the processor 23 determines if the first condition, the second condition and the third condition are met, and in step 59 it is determined if all of the first condition, the second condition and the third condition are met, thereby indicating that it is safe to effect the movement of the tip section 13 instructed by the command signal 37. If the three conditions are not all met, the method returns to step 57 to continue determining if the conditions are met.

If it is determined in step 59 that all three conditions are met, the processor 23 generates the control signal 41 and outputs it on the control output line 39 to the actuating system 21, wherein the control signal 41 is such that it controls the actuating system 21 to move the tip section 21 into the position instructed by the command signal 37, i.e. from the deployed position into the stowed position if the command signal 37 instructs the control unit 19 to effect movement of the tip section 13 into the stowed position, and from the stowed position into the deployed position if the command signal 37 instructs the control unit 19 to effect movement of the tip section 13 into the deployed position.

Once the tip section 13 is in the instructed position the methods proceeds to step 63 and ends.

A method is disclosed for controlling actuation of a foldable wing tip section of a wing of an aircraft. The method comprises receiving (53) at a control unit (19) of an aircraft (1) a command signal (37). The aircraft (1) comprises a wing arrangement (3) which includes a wing (9) comprising a base section (11), e.g., a fixed wing, having a first end portion (11a) adapted to be secured to the fuselage (5) of an aircraft (1) and an opposite second end portion (11b), and a tip section (13) having a third end portion (13a) and an opposite fourth end portion (13b), wherein the third end portion (13a) is pivotably connected to the second end portion (11b) such that the tip section (13) is pivotable about a pivot axis (17) between a deployed position and a stowed position in which the spanwise length of the wing (9) is smaller than in the deployed position, and an actuating system (21) which is coupled to the control unit (19) and which is operable to selectively move, under the control of the control unit (19), the tip section (13) between the deployed position and the stowed position. The command signal (37) is adapted to instruct the control unit (19) to control the actuating system (21) to move the tip section (13) from the deployed position into the stowed position or from the stowed position into the deployed position. The method further comprises receiving at the control unit (19) a first condition indicating signal (29a) indicative of whether or not the aircraft (1) is on the ground and determining by the control unit (19) based on the first condition indicating signal (29a) if a first condition is met that the aircraft (1) is on the ground, receiving at the control unit (19) a second condition indicating signal (29b) indicative of a current speed of the aircraft (1) and determining by the control unit (19) based on the second condition indicating signal (29b) if a second condition is met that the current speed of the aircraft (1) is below a predetermined maximum speed, and receiving at the control unit (19) a third condition indicating signal (29c) indicative of whether or not the aircraft (1) is at a gate (31) of an airport (33) and determining by the control unit (19) based on the third condition indicating signal (29c) if a third condition is met that the aircraft (1) is not at a gate (31) of an airport (33), and controlling the actuating system (21) to effect the movement of the tip section (13) instructed by the command signal (37) only if all of the first condition, the second condition and the third condition are met.

Figure 4:
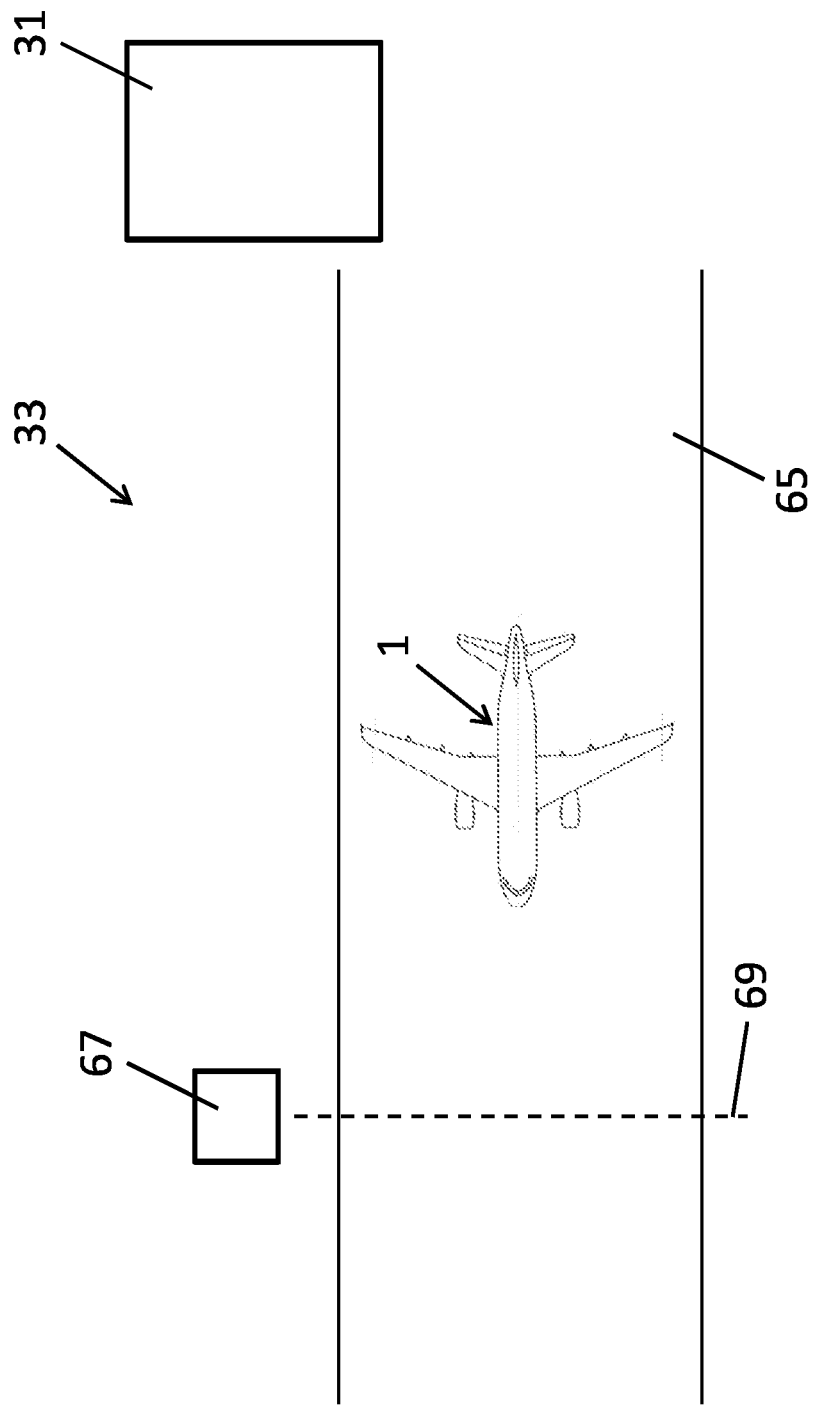
FIG. 4 shows a schematic view of an airport with a gate.

FIG. 4 shows the aircraft 1 on a taxiway 65 of the airport 33 remote from the gate 31. In the illustrated situation the aircraft 1 has left the gate 31 and is travelling on the taxiway towards a runway, which is not illustrated. It is assumed that the tip section 13 is still in the stowed position, and that the distance between the aircraft 1 and the gate 31 and the speed of the aircraft 1 are such that all three conditions are met. Thus, as soon as the pilot issues a command signal 37 instructing movement of the tip section 13 into the deployed position, this movement would be effected by the control unit 19. In order to provide the pilot with an indication that the tip section 13 should be deployed in good time prior to reaching the runway, a location indicating device 67 is installed at a fixed location at the airport 33 next to the taxiway 65. The location indicating device 67 is configured to provide to the aircraft 1 a location indicating signal when the aircraft 1 crosses an imaginary line 69. The location indicating signal may simply be a signal indicating that the aircraft 1 has passed the location indicating device 67, which, in turn, indicates that the tip section 13 should be deployed. The location indicating signal may, e.g., be received by the control unit 19 on the condition signal line 29c. The control unit 19 and the processor 23 may then be adapted to issue a notification to the pilot reminding him or her to issue a command signal 37 for deploying the tip section 13. In the alternative, it is also possible and may be advantageous to adapt the control unit 19 such that upon receiving the location indicating signal from the location indicating device 67 the control of the actuating system 21 for deploying the tip section 13 is automatically effected. In this regard, receipt of the location indicating signal may at the same time be used as the third condition, i.e. as the condition that the aircraft 1 is not at the gate 31.

Of course, as already noted above, the location indicating device 67 and the imaginary line 69 may also be arranged for utilization in the situation in which the aircraft 1 has left or is about to leave a runway and when the tip section 13 is still in the deployed position. In that case, the location indicating signal may simply be a signal indicating that the aircraft 1 has passed the location indicating device 67, which, in turn, indicates that the tip section 13 should be moved into the stowed position. The control unit 19 and the processor 23 may then be adapted to issue a notification to the pilot reminding him or her to issue a command signal 37 for moving the tip section 13 into the stowed position, or an alert that it is not allowed for the aircraft to continue its current movement with the tip section 13 in the deployed position. In the alternative, it is also possible and may be advantageous to adapt the control unit 19 such that upon receiving the location indicating signal from the location indicating device 67 the control of the actuating system 21 for moving the tip section 13 into the stowed position is automatically effected.

While at least one exemplary embodiment of the present inventions is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiments. In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling actuation of a foldable wing tip section of a wing of an aircraft, wherein the aircraft includes wing having a base section having a first end portion adapted to secured to a fuselage of the aircraft and an opposite second end portion, and the foldable wing tip section having a third end portion and an opposite fourth end portion, wherein the third end portion is pivotably connected to the second end portion such that the foldable wing tip section is pivotable about a pivot axis between a deployed position and a stowed position in which the spanwise length of the wing is smaller than in the deployed position, and an actuating system coupled to a control unit and operable to selectively move, under the control of the control unit, the foldable wing tip section between the deployed position and the stowed position, and the method comprises:
receiving at the control unit a command signal, wherein the command signal is adapted to instruct the control unit to control the actuating system to move the foldable wing tip section from the deployed position into the stowed position or from the stowed position into the deployed position,
receiving at the control unit a first condition indicating signal indicative of whether or not the aircraft is on the ground;
determining by the control unit based on the first condition indicating signal whether a first condition is satisfied, wherein the first condition is that the aircraft is on the ground,
receiving at the control unit a second condition indicating signal indicative of a current speed of the aircraft,
determining by the control unit based on the second condition indicating signal whether a second condition is satisfied, wherein the second condition is that the current speed of the aircraft is below a predetermined maximum speed of the aircraft while the aircraft is on the ground,
receiving at the control unit a third condition indicating signal indicative of whether or not the aircraft is at a gate of an airport;
determining by the control unit based on the third condition indicating signal whether a third condition is satisfied, wherein the third condition is that the aircraft is not at the gate of the airport, and
automatically controlling the actuating system to effect movement of the foldable wing tip section in response to the command signal only while the first condition, the second condition and the third condition are each satisfied, wherein the movement moves the foldable wing tip section from the deployed position to the stowed position, or from the stowed position to the deployed position.

2. The method according to claim 1, wherein the first condition indicating signal indicates weight-on one or more-wheels of the aircraft.

3. The method according to claim 1, wherein the second condition indicating signal is indicative of a current speed of the aircraft with respect to the ground.

4. The method according to claim 1, wherein the second condition indicating signal is indicative of a current speed of the aircraft with respect to the air surrounding the aircraft.

5. The method according to claim 1, wherein the third condition indicating signal is a signal indicative of whether or not engines of the aircraft are on.

6. The method according to claim 1, wherein the third condition indicating signal is a location signal indicative of a current location of the aircraft.

7. The method according to claim 6, wherein the location signal is indicative of an absolute position of the aircraft, and the control unit is adapted to determine whether the third condition is met by comparing the absolute position of the aircraft with a map of the airport.

8. The method according to claim 6, wherein the location signal is a signal transmitted by a transmitter installed at the airport when the aircraft passes the transmitter within a predetermined distance, or a signal generated by the aircraft when the aircraft passes a location indicating device, which is installed at the airport, within a predetermined distance.

9. The method according to claim 1, wherein the command signal is a manual command issued by a pilot of the aircraft or is provided automatically by a control computer of the aircraft.

10. The method according to claim 1, further comprising receiving at the control unit a fourth condition indicating signal which is a location signal indicative of a current location of the aircraft, and
wherein the control unit is adapted to issue a warning or to automatically generate the command signal instructing the control unit to control the actuating system to effect movement of the foldable wing tip section between the stowed position and the deployed position based on the fourth condition indicating signal and on a current position of the tip section.

11. The method according to claim 10, wherein the control unit determines based on the fourth condition indicating signal whether the aircraft is entering an area in which the deployed position is prohibited, and to issue a warning in response to the determination that the aircraft is entering the area in which the deployed position is prohibited and the foldable wing tip section is in the deployed position.

12. The method according to claim 10, wherein the control unit determines based on the fourth condition indicating signal whether the aircraft is entering an area which allows movement of the foldable wing move the tip section from the stowed position to the deployed position, and to automatically generate a command signal instructing the control unit to control the actuating system to effect movement of the foldable wing tip section from the stowed position into the deployed position in response to the determination that the aircraft is entering the area in which movement is allowed.

13. The method according to claim 10, wherein:
the fourth condition indicating signal is indicative of an absolute position of the aircraft, and the control unit determines a current position of the aircraft with respect to an airport by comparing the absolute position of the aircraft with a map of the airport, or
the fourth condition indicating signal is a signal transmitted by a transmitter installed at the airport when the aircraft passes the transmitter within a predetermined distance, or
the fourth condition indicating signal is a signal generated by the aircraft as the aircraft passes a location indicating device, which is installed at the airport, within a predetermined distance.

14. An aircraft comprising:
a fuselage,
a wing arrangement including a wing comprising a base section having a first end portion adapted to be secured to the fuselage of an aircraft and an opposite second end portion, and a wing tip section having a third end portion and an opposite fourth end portion, wherein the third end portion is pivotably connected to the second end portion such that the wing tip section is pivotable about a pivot axis between a deployed position and a stowed position in which the spanwise length of the wing is smaller than in the deployed position, wherein the first end portion of the base section is attached to the fuselage and the base section is arranged between the fuselage and the tip section,
an actuating system coupled to the control unit and which is operable to selectively move, under the control of the control unit, the tip section between the deployed position and the stowed position, and
a control unit configured to:
receive a first condition indicating signal indicative of whether the aircraft is on the ground;
receive a second condition indicating signal indicative of a current speed of the aircraft;
determine whether the current speed is below a preset maximum speed of the aircraft while the aircraft is on the ground;
receive a third condition indicating signal indicative of whether the aircraft is at a gate of an airport;
automatically control the actuating system to fold the wing tip section relative to the base section only while each and every of the following conditions occur: (i) a command signal is received to fold the wing tip section, (ii) the first condition indicating signal indicates that the aircraft is on the ground; (iii) the determination is that the current speed is no greater than the preset maximum speed, and (iv) the third condition indicating signal indicates that the aircraft is not at the gate, and
in response to the automatic control of the actuating system to fold the wing tip section, moving the foldable wing tip section from the deployed position to the stowed position, or moving the foldable wing tip section from the stowed position to the deployed position.

* * * * *